United States Patent [19]

Brown et al.

[11] Patent Number: 5,405,082
[45] Date of Patent: Apr. 11, 1995

[54] OXY/FUEL BURNER WITH LOW VOLUME FUEL STREAM PROJECTION

[75] Inventors: John T. Brown, Corning; Jerry Tinz, Addison, both of N.Y.

[73] Assignee: Corning Incorporated, Corning, N.Y.

[21] Appl. No.: 85,832

[22] Filed: Jul. 6, 1993

[51] Int. Cl.[6] .......................... C03B 5/235; B05B 7/10
[52] U.S. Cl. ........................................ 239/8; 239/404; 239/424.5; 431/9; 431/187
[58] Field of Search .............. 239/8, 399, 402–406, 239/423–424.5, 433; 431/9, 187, 188, 353

[56] References Cited

U.S. PATENT DOCUMENTS

| | | |
|---|---|---|
| 1,557,148 | 10/1925 | Ferngren . |
| 1,900,361 | 3/1933 | Mulholland et al. . |
| 2,623,577 | 12/1952 | Cowles .......................... 239/406 |
| 3,390,838 | 7/1968 | Stalberger ........................ 239/406 |
| 3,582,310 | 6/1971 | Avery et al. . |
| 3,664,587 | 5/1972 | Akhmedov et al. ............. 239/404 |
| 3,676,048 | 7/1972 | Sellors, Jr. et al. . |
| 3,787,168 | 1/1974 | Koppang et al. . |
| 3,809,525 | 5/1974 | Wang et al. . |
| 3,861,858 | 1/1975 | Hemsath et al. . |
| 3,905,751 | 9/1975 | Hemsath et al. . |
| 3,999,972 | 12/1976 | Brax . |
| 4,017,253 | 4/1977 | Wielang et al. . |
| 4,130,389 | 12/1978 | Kaburagi et al. . |
| 4,531,960 | 7/1985 | Desprez . |
| 4,533,314 | 8/1985 | Herberling . |
| 4,541,796 | 9/1985 | Anderson ........................ 239/423 |
| 4,547,150 | 10/1985 | Vereecke . |
| 4,552,579 | 11/1985 | Blumenfeld et al. . |
| 4,604,123 | 8/1986 | Desprez et al. . |
| 4,680,051 | 7/1987 | Blumenfeld et al. . |
| 4,690,635 | 9/1987 | Coppin . |
| 4,797,087 | 1/1989 | Gitman ............................. 431/187 |
| 4,842,509 | 6/1989 | Hasenack . |
| 4,878,829 | 11/1989 | Anderson ......................... 239/423 |
| 4,911,744 | 3/1990 | Petersson et al. . |
| 4,954,076 | 9/1990 | Fioravanti et al. .................... 431/9 |
| 4,986,748 | 1/1991 | Brown et al. ....................... 239/424 |
| 5,092,760 | 3/1992 | Brown et al. ..................... 239/424.5 |
| 5,139,558 | 8/1992 | Lauwers ............................... 65/136 |
| 5,147,438 | 9/1992 | Castelain et al. .................... 65/136 |
| 5,169,424 | 12/1992 | Grinnen et al. . |
| 5,199,866 | 4/1993 | Joshi et al. ........................ 239/424 |
| 5,251,823 | 10/1993 | Joshi et al. ........................ 239/406 |

FOREIGN PATENT DOCUMENTS 54-73331 12/1979 Japan .

OTHER PUBLICATIONS

Brown, John T., *Glass Melting: The Elegance of Direct-Fired Oxy-Fuel*, Ceramic Industry, Mar. 1, 1992.

*Primary Examiner*—Karen B. Merritt
*Attorney, Agent, or Firm*—Robert L. Carlson

[57] ABSTRACT

There is disclosed an oxy/fuel burner with a low volume fuel stream. The burner projects a stream of fuel from a fuel orifice and projects an annular stream of oxygen around the stream of fuel from an annular oxygen orifice such that the oxygen velocity to gas velocity ratio is between 1/1 and 3/1, providing a flame whose hottest point is about 5 inches from the fuel orifice.

31 Claims, 3 Drawing Sheets

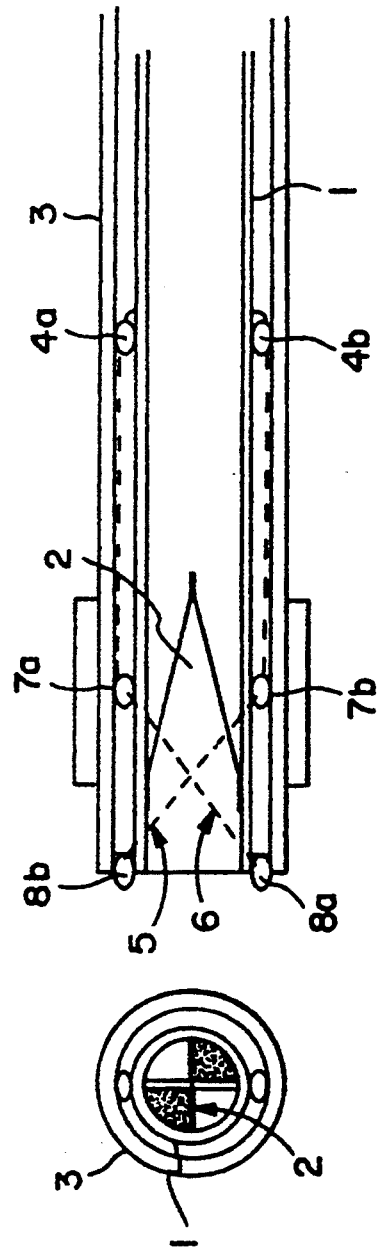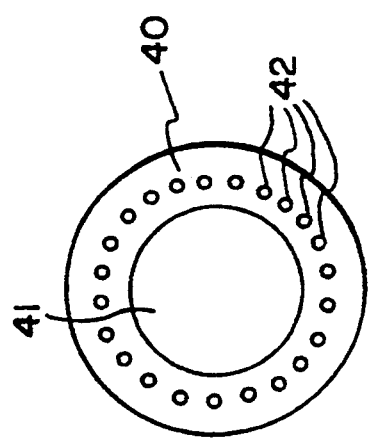

OXY/FUEL BURNER WITH LOW VOLUME FUEL STREAM PROJECTION

BACKGROUND OF THE INVENTION

1. Field of the Invention

The present invention relates to oxy/fuel fired distribution channels and their use in glass making and to oxy/fuel combustion methods and burners which may be used in a distribution channel.

2. History of the Prior Art

In the production of glass, a distribution channel has two main purposes. First, the distribution channel delivers molten glass from the furnace to the forming means. Second, the distribution channel modifies the temperature of the molten glass. Usually, the temperature of the molten glass must be lowered.

Modifying the temperature of the molten glass brings the glass to a viscosity required for forming. Viscosity requirements vary widely depending on the glass and forming means used. Uniformity of temperature for all glass entering the forming means is the measure of excellence. Uniformity of gob weight or product dimensions are dependent upon uniform temperatures in the gob.

However, modifying the temperature of molten glass in a distribution channel is difficult due to temperature differences existing in the glass. The glass at the sides of the distribution channel is cooler than the glass in the center of the distribution channel. This is because the glass at the sides of the channel transfers heat through the walls of the channel, while the glass in the center of the channel is insulated from heat loss by the surrounding glass.

Thus, it is usually necessary to heat the glass at the sides of the distribution channel so as to raise its temperature to that of the glass in the center of the channel. Conversely, the glass in the center of the distribution channel is usually simultaneously cooled so as to lower its temperature to that of the glass at the sides of the channel.

The temperature of the glass at the sides of the distribution channel is commonly raised with burners. Recently, a few glassmakers have tried oxy/fuel burners in place of air/fuel burners. Compared with air/fuel burners, oxy/fuel burners provide three times the available heat from the same fuel input and a significant reduction in NOx.

One major problem has historically plagued the practice of heating the glass at the sides of a distribution channel with burners. The heat produced by the burners travels to the center of the channel. This heats the glass in the center of the channel, which should be cooled.

To deal with this problem, wind cooling of the center of the distribution channel and "wings" substantially separating the center and sides of the channel have been utilized. However, energy from the burners still makes its way to the center of the channel, where the heating flames and cooling wind compete, making temperature uniformity difficult to achieve. Therefore, a need exists for a method of making glass comprising an improved method of modifying the temperature of the molten glass in a distribution channel.

SUMMARY OF THE INVENTION

The present invention satisfies the need described above. The present invention allows glass at the sides of a distribution channel to be heated with burners, while greatly reducing any secondary heating affect on the glass in the center of the distribution channel. This is accomplished through use of an oxy/fuel flame having a hottest point within about five inches of the base of the flame and which preferably provides a low level of products of combustion.

Generally, the present invention provides a method of producing glass articles, wherein glass flows from a furnace, through a distribution channel, and then to forming means, the method comprising forming at least one oxy/fuel flame at the sides of the distribution channel, the flame having a hottest point within about 5 inches of the base of the flame so as to produce a large thermal gradient between the sides of the distribution channel and the center of the distribution channel. The flame may provide between about 7 SCFH and 15 SCFH of fuel and preferably provides between about 0.5 SCFH and 15 SCFH of fuel.

The present method of making glass articles may be used with other known methods of modifying the temperature of glass in a distribution channel. These known methods may include, for example, cooling the center of the distribution channel with a longitudinal flow of air, and/or separating the sides of the distribution channel from the center of the distribution channel by placing wings in the crown of the channel which project downward towards the surface of the glass flowing through the channel.

The present invention also provides a novel distribution channel for carrying out the present method of making glass articles.

Furthermore, the present invention provides a method and apparatus for producing an oxy/fuel flame having a hottest point within about five inches of the base of the flame. In one embodiment, the method comprises projecting a stream of fuel from a fuel orifice at a volume of between about 7 SCFH and 15 SCFH of fuel, and projecting an annular stream of oxygen around said stream of fuel from an annular oxygen orifice surrounding said fuel orifice at an oxygen velocity to gas velocity ratio between about 1/1 and 3/1. A preferred embodiment of the method comprises projecting a stream of fuel from a fuel orifice at a volume of between about 0.5 SCFH and 15 SCFH of fuel, projecting an annular stream of oxygen around said stream of fuel from an annular oxygen orifice surrounding said fuel orifice at an oxygen velocity to gas velocity ratio between about 1/1 and 3/1, and increasing turbulence in at least one of the streams.

In a preferred embodiment of the present method and apparatus of making an oxy/fuel flame, the stream of fuel may be projected from a fuel tube which receives fuel at an inlet end and expels fuel at an outlet end, and the stream of oxygen may be projected from an oxygen tube which receives oxygen at an inlet end and expels oxygen at an outlet end, the oxygen tube surrounding the fuel tube. The preferred method of increasing turbulence is by placing at least one spiral member between the fuel tube and the oxygen tube so as to produce angular oxygen flow.

It is an object of the present invention to provide a method of making glass articles comprising an improved method of modifying the temperature of molten glass in a distribution channel.

It is an object of the present invention to provide a novel distribution channel for use in glassmaking capable of carrying out the present method of making glass articles.

It is an object of the present invention to provide a method and apparatus for forming an oxy/fuel flame having a hottest point within about five inches of the flame's base and capable of being used in a glass distribution channel.

BRIEF DESCRIPTION OF THE FIGURES

FIG. 1A is a cross-sectional view of part of an oxy/fuel burner of the present invention. FIG. 1A shows the fuel tube and the oxygen tube, as well as the most preferred embodiment of the turbulence means.

FIG. 1B is an end-view of the oxy/fuel burner illustrated in FIG. 1A.

FIG. 6 is an end-view of one embodiment of the fuel orifice and oxygen orifice of the present oxy/fuel burner.

DESCRIPTION OF THE PREFERRED EMBODIMENTS

Figure 2:
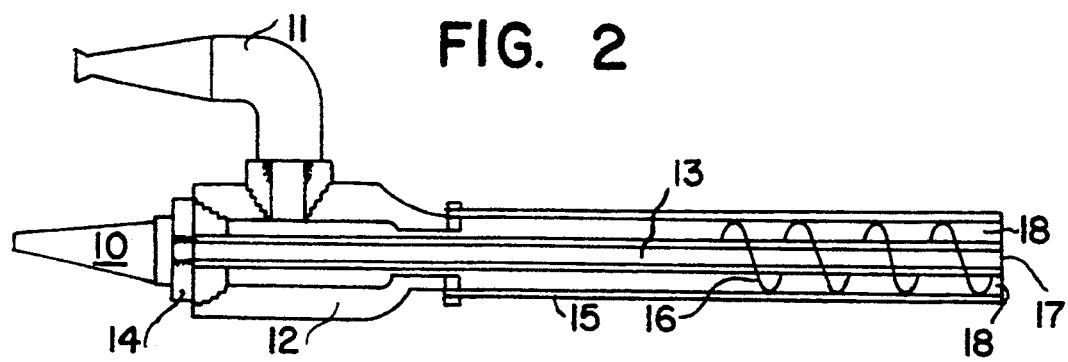
FIG. 2 is a cross-sectional view of an oxy/fuel burner of the present invention.

The present invention is based on the discovery that use of one or more short oxy/fuel flames to heat the sides of a glass distribution channel significantly reduces the amount of heat energy which travels to the center of the distribution channel and which then causes deleterious heating of the glass in the center of the channel.

Oxy/fuel firing provides superior characteristics over regular air/fuel firing. Oxy/fuel firing provides a significant reduction in NOx. Overall, oxy/fuel firing provides a 90% reduction in the volume, or mass, of exhaust gases, lowering turbulence and surface glass losses.

Most important to the problems of glass distribution channels, oxy/fuel firing provides about three times the available heat from the same fuel input. Furthermore, the heat is very concentrated.

Most of the heat from an oxy/fuel flame appears to be reflected from the cover block down to the molten glass. However, there is still horizontal heat transfer. The longer the flame, the more of the heat energy produced finds its way to the center of the channel. In the present method of producing glass articles, the hottest point of the flame produced to heat the sides of the distribution channel is within about five inches of the base of the flame. Preferably, the hottest point of the flame is within about three inches of the base of the flame. As used herein, the "base" of the flame shall be defined as the face or outermost part of the burner or device used to produce the flame.

To carry out the present method of making glass articles, the present invention provides a novel distribution channel. Generally, the present invention provides a distribution channel for use in glassmaking comprising at least one oxy/fuel burner situated in the sides of the distribution channel, the at least one oxy/fuel burner capable of producing a flame having a hottest point within about five inches of the base of the flame so as to produce a large thermal gradient between the sides of the distribution channel and the center of the distribution channel. The burners may be situated in the sides of the distribution channel via methods well known to those skilled-in-the-art. The burners may be placed within insulated burner blocks and situated at spaced intervals within the sides of the cover block. The burner block may have a flame tunnel to direct the oxy/fuel flame.

When firing from the sides of a distribution channel, the short length of these flames combined with the efficient and concentrated oxy/fuel combustion provides for a significantly improved thermal gradient between the sides of the distribution channel and the center of the distribution channel.

The at least one oxy/fuel burner used in the present distribution channel provides between about 7 SCFH and 15 SCFH of fuel and preferably between about 0.5 SCFH and 15 SCFH of fuel. Preferably, the at least one oxy/fuel burner is capable of producing a flame having a hottest point within about three inches of its base. As used herein, "fuel" means any gaseous fuel suitable for glassmaking. Due to the efficiency of oxy/fuel firing, this low volume of fuel still produces significant heating. Despite the fact that the heat is brought closer to the burner, the present invention may be utilized without complicated and expensive cooling mechanisms to protect the burner. Furthermore, the wear and tear on other elements of the distribution channel caused by combustion products and turbulence is reduced.

To carry out the preferred embodiments of the present method of making glass articles, the distribution channel of the present invention may further comprise known apparatus for cooling the center of the distribution channel. For example, the present distribution channel may include cooling means for providing a longitudinal flow of air for cooling the center of the distribution channel and/or wings which project downward from the crown of the distribution channel towards the surface of the glass flowing through the distribution channel. The wings may project to any desired height, but preferably project to just above or just below the surface of the glass flowing through the distribution channel.

Figure 3:
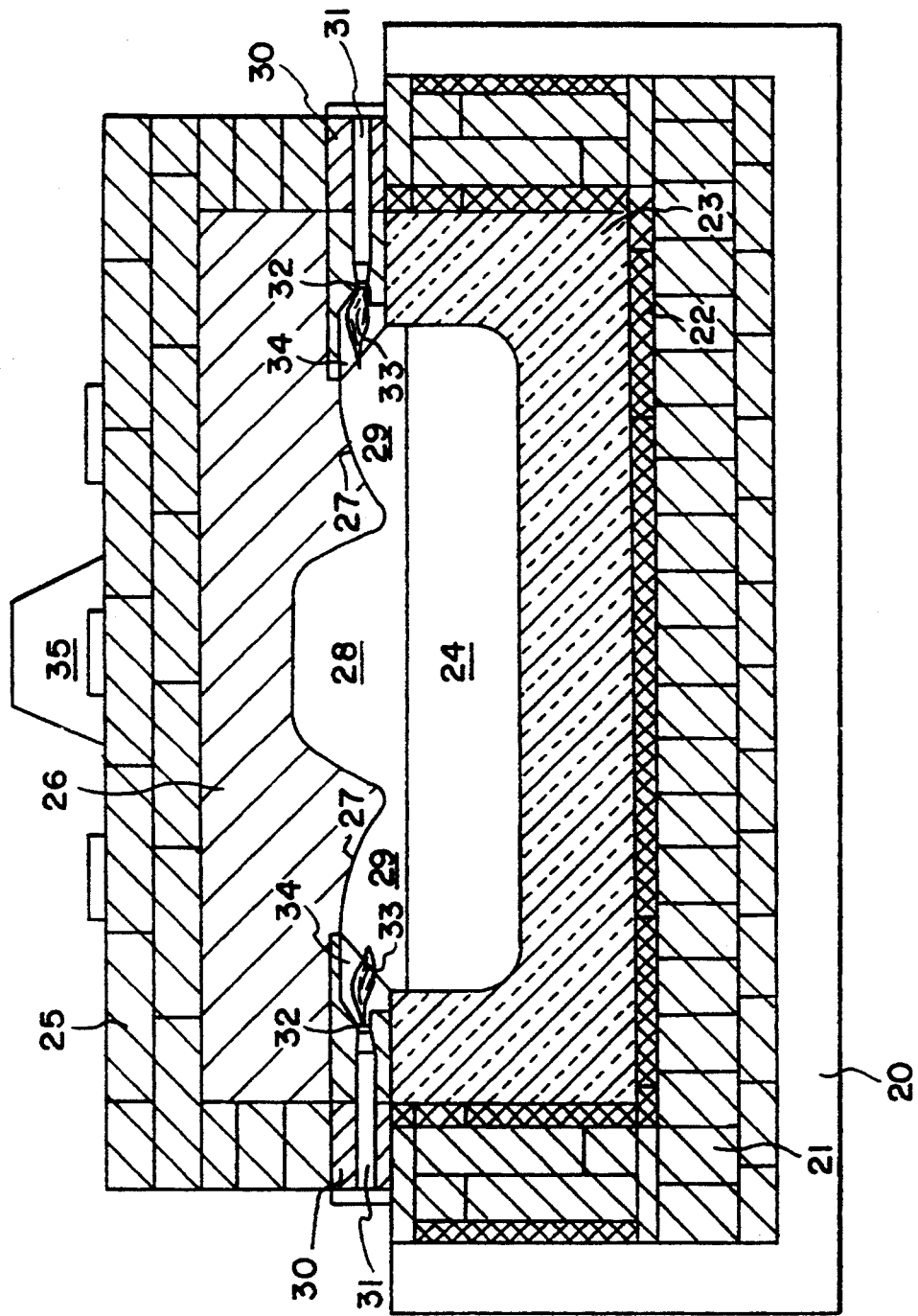
FIG. 3 is a cross-sectional illustration of a distribution channel of the present invention.

FIG. 3 is a cross-sectional illustration of the cooling zone of a distribution channel of the present invention. The distribution channel is about nine feet long and is operated under pressure. The distribution channel sits in steel support 20. Molten glass 24 flows through a glass channel defined by support blocks 21, channel block insulation 22 and glass channel block 23.

Covering the channel are cover block insulation 25 and cover block 26. Cover block 26 extends towards the molten glass 24, forming two wings 27. The center 28 of the channel is substantially separated from the sides 29 of the channel by wings 27. Cooling wind is blown longitudinally through the center 28 of the channel (i.e. —perpendicular to the plane of the page) by a cooling fan or other mechanism (not shown). Cooling wind is vented out exhaust stack 35.

Insulated burner blocks 30 are situated at the sides of the distribution channel within cover block 26. Oxy/fuel burners 31 are situated within the burner blocks. The oxy/fuel burners 31 provide between about 0.5 SCFH and 15 SCFH of methane fuel. Flames 33 exit out of burner orifices 32. The flames' hottest points are within about five inches of the burner orifices 32. The flames travel through flame tunnels 34 which are formed within the burner blocks 30. The oxy/fuel burners 31 in the sides of the distribution channel are situated at six inch intervals along the sides of the distribution channel. Thirteen oxy/fuel burners 31 are placed on each side of the distribution channel.

The present invention also provides an oxy/fuel burner and related method for producing an oxy/fuel flame which has its hottest point within about 5 inches of the base of the flame. One embodiment of the oxy/fuel burner comprises fuel means for projecting a stream of fuel from a fuel orifice at a volume of between about 7 SCFH and 15 SCFH of fuel, and oxygen means for projecting an annular stream of oxygen around the stream of fuel from an annular oxygen orifice surrounding the fuel orifice at an oxygen velocity to gas velocity ratio between about 1/1 and 3/1. Projecting the stream of oxygen around the stream of fuel causes significant mixing and a shorter burn time.

By increasing the turbulence of either the oxygen stream, the fuel stream or both, mixing is significantly increased. This allows for the desired flame characteristics at a lower operable fuel flow. Thus, a preferred embodiment of the present oxy/fuel burner comprises fuel means for projecting a stream of fuel from a fuel orifice at a volume of between about 0.5 SCFH and 15 SCFH of fuel, oxygen means for projecting an annular stream of oxygen around the stream of fuel from an annular oxygen orifice surrounding the fuel orifice at an oxygen velocity to gas velocity ratio between about 1/1 and 3/1, and turbulence means for increasing turbulence in at least one of the streams.

The oxygen velocity to gas velocity ratio of the present oxy/fuel burner and related method is preferably about 1.5/1.

The specific velocities of the oxygen and fuel are dependent on a number of factors, including the oxygen and fuel supply pressures, the specific volume flow of the fuel, and the cross-sectional area of the fuel and oxygen orifices. Under most distribution channel conditions, it is preferred that the stream of fuel be projected from the fuel orifice at a velocity below about 500 ft./sec., and most preferably at a velocity below about 250 ft./sec.

For a given pressure and flow rate, the velocities of the fuel stream and oxygen stream are dependent on the cross-sectional area of the fuel and oxygen orifices. The fuel orifice preferably has a cross-sectional area between about 0.00159 square inches and 0.00636 square inches, and most preferably has a cross-sectional area of about 0.0038 square inches. At 4 SCFH of fuel, the lower limit (0.00159 square inches) will produce a fuel velocity of about 100 ft./sec. and the upper limit (0.00636 square inches) will produce a fuel velocity of about 25 ft./sec. At 15 SCFH of fuel, the lower limit will produce a fuel velocity of about 375 ft./sec. and the upper limit will produce a fuel velocity of about 94 ft./sec.

The fuel orifice may be placed in front of or behind the oxygen orifice, but is preferably flush with the oxygen orifice. In a preferred embodiment, the fuel means includes a fuel tube for receiving fuel at an inlet end and expelling fuel at an outlet end, and the oxygen means includes an oxygen tube for receiving oxygen at an inlet end and expelling oxygen at an outlet end, the oxygen tube surrounding the fuel tube. The oxygen tube and fuel tube may be multiple widths, having a larger width for receiving oxygen or fuel and narrowing, either suddenly or gradually, to a smaller width to provide the desired oxygen or fuel velocity at a given pressure.

The oxygen and fuel tubes may be made from any suitable material, but are preferably made of a material selected from the group consisting of refractory metal and ceramic. In the most preferred scenario, the fuel tube is refractory metal, as metal is a better conductor of heat and resists fuel cracking, and the oxygen tube is ceramic, as ceramic resists oxidation.

The fuel tube is preferably any thickness under about 1 mm. The oxygen tube is preferably between about 0.4 mm and 1.5 mm thick and most preferably as thin as possible. The present oxy/fuel burner may replace air/fuel burners or other oxy/fuel burners currently in distribution channels.

The fuel tube and oxygen tube may be held in position via apparatus well known to those skilled-in-the-art.

Increasing turbulence in the oxygen stream and/or the fuel stream is critical to the preferred embodiment of the present invention. The turbulence means of the present oxy/fuel burner may include known apparatus, such as, for example, rifling in the oxygen tube, a flared end to the fuel tube with the oxygen tube rearward, a quartered exit to the oxygen tube, rotated crosshairs in the end of the fuel tube, and a partially turned-in end to the oxygen tube.

A preferred, novel turbulence means comprises at least one spiral wire fixed between the oxygen tube and the fuel tube so as to produce angular momentum in the oxygen stream. The spiral wires are preferably made of refractory metal. The spiral wire or wires may be tack welded to the outer diameter of the fuel tube or to the inner diameter of the oxygen tube, or may simply be held in place by the pressure of the wires against the two tubes. Use of a spiral wire is simple and may be used in conjunction with tubes of very small diameter without great difficulty. Furthermore, the oxygen stream, rather than the fuel stream, is used to increase the turbulence. As oxygen has a greater atomic weight than most of the fuels used in burners, it will cause a greater increase in turbulence than the fuel for a given angular momentum.

A cross-sectional view of one embodiment of an oxy/fuel burner of the present invention which was assembled for tests is illustrated in FIG. 2. Fuel inlet 10 can accept a fuel pipe carrying the applicable gaseous fuel. Oxygen inlet 11 can accept an oxygen pipe carrying gaseous oxygen. Fuel inlet 10 screws into the back of hollow brass body 12. Oxygen inlet 11 screws into the side of hollow brass body 12. Fuel tube 13 is inserted through the center of hollow brass body 12 and fuel inlet 10 and screws into panel 14 of fuel inlet 10. Oxygen tube 15 encircles fuel tube 13, and the back end of oxygen tube 15 is seated around the front nose of hollow brass body 12.

The fuel tube 13 and the oxygen tube 15 are made of Inconel 600. The fuel tube has an inner diameter of about 0.070 inches and an outer diameter of about 0.1255 inches. The oxygen tube has an inner diameter of about 0.1875 inches and an outer diameter of about 0.2465 inches. Fuel fed through fuel inlet 10 travels to fuel tube 13 and then out fuel orifice 17. Oxygen fed through oxygen inlet 11 travels to the center of hollow brass body 12, surrounds fuel tube 13, and travels to oxygen tube 15 and out oxygen orifice 18.

Spiral wire 16 is positioned between fuel tube 13 and oxygen tube 15. The ends of spiral wire 16 are tack welded to the outer diameter of fuel tube 13. Spiral wire 16 has a diameter of about 0.023 inches. Spiral wire 16 makes four turns around fuel tube 13 and has a pitch of about 3/16 inches.

Figure 4:
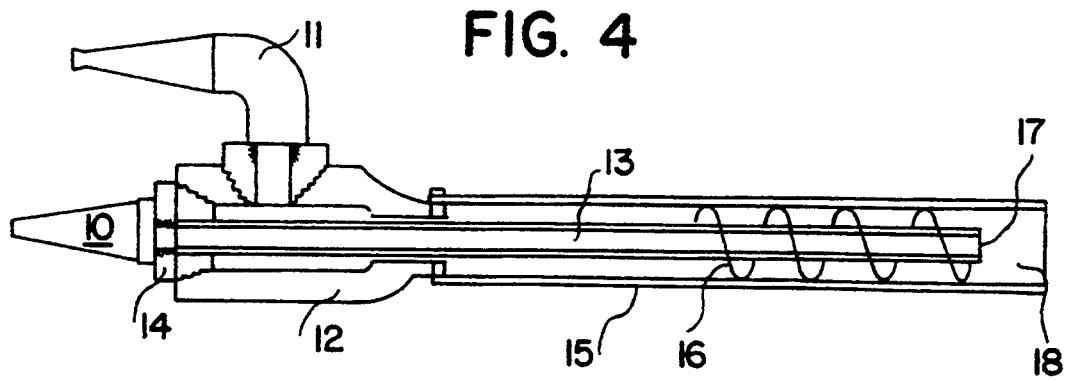
FIG. 4 is a cross-sectional view of an oxy/fuel burner of the present invention having the fuel orifice behind the oxygen orifice.
Figure 5:
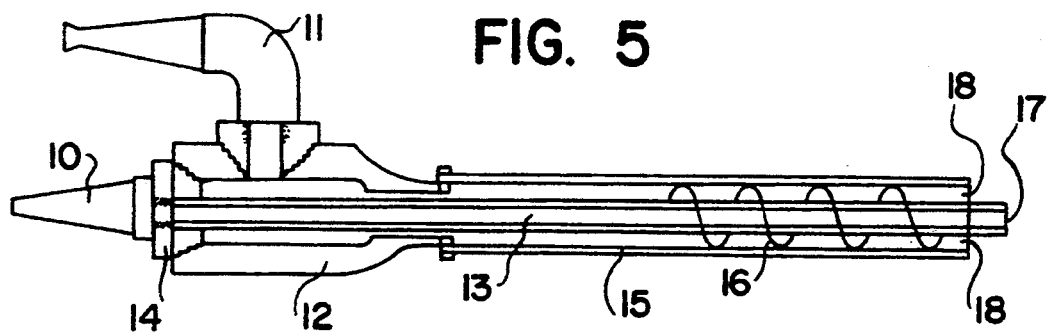
FIG. 5 is a cross-sectional view of an oxy/fuel burner of the present invention having the fuel orifice in front of the oxygen orifice.

As shown in FIG. 2, the fuel orifice 17 is preferably flush with the fuel orifice 18. However, the fuel orifice 17 may be in front of the oxygen orifice 18, as shown in FIG. 5. Conversely, the fuel orifice 17 may be behind the oxygen orifice 18, as shown in FIG. 4.

The most preferred embodiment of the turbulence means is shown in FIGS. 1A and 1B. Within the fuel tube 1 lies turbulence means 2. The turbulence means 2 comprises a flat piece of refractory metal which is welded to the inside of the fuel tube and which is rotated about 90° at its end so that the fuel orifice appears cut into quarters when viewed directly. Between fuel tube 1 and oxygen tube 3 are two spiral wires 5 and 6. The spiral wires 5 and 6 begin as straight wires which are welded at opposite outer sides of the fuel tube at 4a and 4b, about 0.75 inches from the fuel orifice. The spiral wires 5 and 6 are again welded to opposite outer sides of the fuel tube at 7a and 7b, about 0.25 inches from the fuel orifice. From points 7a and 7b the spiral wires 5 and 6 rotate around the outside of the fuel tube till reaching points 8a and 8b, where the spiral wires 5 and 6 are again welded to the outside of the fuel tube.

Many deviations of the present oxy/fuel burner can be envisioned without deviating from the present invention. For example, the annular oxygen orifice of the present burner may be divided into an arrangement of small circular orifices surrounding the fuel orifice. As illustrated in FIG. 6, oxygen orifice 40 surrounds fuel orifice 41. Oxygen orifice 40 comprises multiple smaller circular orifices 42 which are arranged in a circle around fuel orifice 41.

The oxy/fuel burner illustrated in FIG. 2 was fired for testing. Table 1 shows the results of one firing test. Methane was supplied as fuel. The first column of Table 1 shows the time at which the readings were taken. The fuel flow of the burner, shown in the second and third columns, began at about 12 SCFH and was reduced to 8 SCFH and finally 2 SCFH. The oxygen flow, shown in the fourth and fifth columns, began at 26.4 SCFH and was reduced to 17.6 SCFH and gradually to 1.5 SCFH. The sixth through tenth columns show the measured temperature in degrees celsius at 2, 4, 6, 8, and 10 inches from the fuel orifice. The Table shows that the highest temperature was measured at four inches from the fuel orifice (base of the flame). This remained constant no matter what the fuel flow was. Tables 2, 3 and 4 show data from similar tests using the burner described above. These Tables also show the highest temperature measured at four inches from the fuel orifice (the base of the flame). Table 4 shows a span of almost seven hours to the first reading of that test to the last reading of that test.

TABLE 1

| TIME | GAS CFH | IN. WC. | OXYGEN CFH | IN. WC | \multicolumn{5}{c}{DISTANCE FROM FUEL ORIFICE} |
|---|---|---|---|---|---|---|---|---|---|
| | | | | | 2" | 4" | 6" | 8" | 10" |
| 11:30 | 12.0 | 7.4 | 26.4 | 8.9 | 777 | 841 | 802 | 774 | 764 |
| 13:16 | 12.0 | 7.4 | 26.4 | 9.8 | 916 | 978 | 953 | 936 | 935 |
| 13:26 | 8.0 | 3.6 | 17.6 | 6.1 | — | — | — | — | — |
| 15:25 | 8.0 | 3.6 | 17.6 | 6.1 | 906 | 956 | 931 | 906 | 884 |
| 15:30 | 2.0 | 0.5 | 4.5 | 1.7 | — | — | — | — | — |
| 16:33 | 2.0 | 0.5 | 4.5 | 1.5 | 762 | 774 | 752 | 735 | 714 |
| 16:52 | 2.0 | 0.5 | 4.5 | 1.5 | 737 | 747 | 723 | 706 | 685 |

TABLE 2

| TIME | GAS CFH | IN. WC. | OXYGEN CFH | IN. WC | \multicolumn{5}{c}{DISTANCE FROM FUEL ORIFICE} |
|---|---|---|---|---|---|---|---|---|---|
| | | | | | 2" | 4" | 6" | 8" | 10" |
| — | 15.0 | — | 33.15 | 23.0 | — | — | — | — | — |
| 13:05 | 8.3 | 1.1 | 22.6 | 14.2 | 756 | 790 | 739 | 688 | 646 |
| 14:45 | 3.5 | 1.0 | 8.5 | 4.8 | 715 | 743 | 715 | 686 | 653 |
| 14:15 | 3.3 | 1.0 | 8.3 | 4.7 | 695 | 725 | 695 | 665 | 633 |

TABLE 3

| TIME | FLOW CFH | \multicolumn{5}{c}{DISTANCE FROM FUEL ORIFICE} |
|---|---|---|---|---|---|---|
| | | 2" | 4" | 6" | 8" | 10" |
| 10:29 | 8.0 | 830 | 860 | 849 | 835 | 820 |
| 10:45 | 8.0 | 842 | 882 | 870 | 854 | 841 |
| 11:00 | 8.0 | 845 | 888 | 877 | 861 | 850 |
| 11:15 | 8.0 | 853 | 896 | 881 | 866 | 855 |
| 11:30 | 8.0 | 860 | 902 | 886 | 871 | 859 |
| 11:45 | 8.0 | 864 | 907 | 890 | 875 | 863 |
| 12:00 | 8.0 | 869 | 911 | 894 | 879 | 867 |
| 12:15 | 8.0 | 873 | 915 | 898 | 883 | 872 |
| 12:30 | 8.0 | 878 | 917 | 903 | 888 | 876 |
| 12:45 | 8.0 | 880 | 922 | 906 | 891 | 879 |

TABLE 4

| TIME | GAS CFH | IN. WC. | OXYGEN CFH | IN. WC | \multicolumn{5}{c}{DISTANCE FROM FUEL ORIFICE} |
|---|---|---|---|---|---|---|---|---|---|
| | | | | | 2" | 4" | 6" | 8" | 10" |
| 10:10 | 12 | 7.5 | 26.5 | 9.5 | 842 | 896 | 833 | 796 | 785 |
| 10:20 | 12 | 7.6 | 26.4 | 9.5 | 854 | 906 | 844 | 807 | 797 |
| 10:30 | 12 | 7.5 | 26.5 | 9.7 | 874 | 925 | 864 | 828 | 810 |
| 10:35 | \multicolumn{9}{c}{REDUCED FLOW} |
| 10:40 | 8.0 | 3.7 | 17.0 | 5.8 | — | — | — | — | — |
| 10:50 | 8.0 | 3.7 | 17.0 | 5.8 | 857 | 900 | 854 | 826 | 808 |
| 11:00 | 8.0 | 3.7 | 17.0 | 5.8 | 850 | 893 | 853 | 823 | 805 |
| 11:10 | 8.0 | 3.7 | 17.0 | 5.8 | 847 | 891 | 854 | 823 | 804 |
| 5:00 pm | 8.0 | 3.7 | 17.0 | 6.4 | 966 | 1003 | 958 | 923 | 895 |

It will be appreciated that a method of making glass articles including the use of short oxy/fuel flames of preferably low fuel flow in the distribution channel, a novel glass distribution channel, a method of making an oxy/fuel flame whose hottest point is within five inches of the flame's base, and a novel oxy/fuel burner have been disclosed. Although the present invention has been shown and described with respect to detailed embodiments thereof, it will be understood by those skilled-in-the-art that various changes in the form and detail thereof may be made without departing from the spirit and scope of the present invention.

I claim:

1. An oxy/fuel burner, comprising:
   fuel means for projecting a stream of fuel from a fuel orifice at a volume of between about 7 SCFH and 15 SCFH of fuel; and
   oxygen means for projecting an annular stream of oxygen around said stream of fuel from an annular oxygen orifice surrounding said fuel orifice at an oxygen velocity to gas velocity ratio between about 1/1 and 3/1 such that a flame is produced having a hottest point within about 5 inches of said fuel orifice.

2. The oxy/fuel burner of claim 1, wherein
said fuel means includes a fuel tube for receiving fuel at an inlet end and expelling fuel at an outlet end; and
said oxygen means includes an oxygen tube for receiving oxygen at an inlet end and expelling oxygen at an outlet end, said oxygen tube surrounding said fuel tube.

3. The oxy/fuel burner of claim 1, further comprising: means for increasing turbulence of at least one of said stream of fuel or said stream of oxygen.

4. An oxy/fuel burner, comprising:
fuel means for projecting a stream of fuel from a fuel orifice at a volume of between about 0.5 SCFH and 15 SCFH of fuel;
oxygen means for projecting an annular stream of oxygen around said stream of fuel from an annular oxygen orifice surrounding said fuel orifice at an oxygen velocity to gas velocity ratio between about 1/1 and 3/1; and
turbulence means for increasing turbulence in at least one of said streams such that a flame is produced having a hottest point within about 5 inches of said fuel orifice.

5. The oxy/fuel burner of claim 4, wherein
said fuel means includes a fuel tube for receiving fuel at an inlet end and expelling fuel at an outlet end; and
said oxygen means includes an oxygen tube for receiving oxygen at an inlet end and expelling oxygen at an outlet end, said oxygen tube surrounding said fuel tube.

6. The oxy/fuel burner of claim 5, wherein said tubes are made of a material selected from the group consisting of ceramic and refractory metals.

7. The oxy/fuel burner of claim 5, wherein said tubes have a wall thickness between about 0.4 mm and 1.5 mm.

8. The oxy/fuel burner of claim 5, wherein said turbulence means comprises at least one spiral wire, fixed between said fuel tube and said oxygen tube, for producing angular oxygen flow so as to increase turbulence.

9. The oxy/fuel burner of claim 4, wherein said fuel orifice is flush with said annular oxygen orifice.

10. The oxy/fuel burner of claim 4, wherein said fuel orifice is in front of said annular oxygen orifice.

11. The oxy/fuel burner of claim 4, wherein said fuel orifice is behind said annular oxygen orifice.

12. The oxy/fuel burner of claim 4, wherein said fuel orifice has a cross-sectional area between about 0.00159 square inches and 0.00636 square inches.

13. The oxy/fuel burner of claim 12, wherein said fuel orifice has a cross-sectional area of about 0.0038 square inches.

14. The oxy fuel burner of claim 4, wherein said annular oxygen orifice is divided into an arrangement of smaller circular orifices surrounding said fuel orifice.

15. A method of producing an oxy/fuel flame having a hottest point within about five inches of the base of said flame, said method comprising:
projecting a stream of fuel from a fuel orifice at a volume of between about 7 SCFH and 15 SCFH of fuel; and
projecting an annular stream of oxygen around said stream of fuel from an annular oxygen orifice surrounding said fuel orifice at an oxygen velocity to gas velocity ratio between about 1/1 and 3/1.

16. The method of claim 15, including
projecting said stream of fuel from a fuel tube which receives fuel at an inlet end and expels fuel at an outlet end; and
projecting said stream of oxygen from an oxygen tube which receives oxygen at an inlet end and expels oxygen at an outlet end, said oxygen tube surrounding said fuel tube.

17. The method of claim 15, further comprising:
increasing turbulence in at least one of said streams.

18. A method of producing an oxy/fuel flame having a hottest point within about five inches of the base of said flame, said method comprising:
projecting a stream of fuel from a fuel orifice at a volume of between about 0.5 SCFH and 15 SCFH of fuel;
projecting an annular stream of oxygen around said stream of fuel from an annular oxygen orifice surrounding said fuel orifice at an oxygen velocity to gas velocity ratio between about 1/1 and 3/1; and
increasing turbulence in at least one of said streams.

19. The method of claim 18, including
projecting said stream of fuel from a fuel tube which receives fuel at an inlet end and expels fuel at an outlet end; and
projecting said stream of oxygen from an oxygen tube which receives oxygen at an inlet end and expels oxygen at an outlet end, said oxygen tube surrounding said fuel tube.

20. The method of claim 19, including utilizing a fuel tube and an oxygen tube which are made of materials selected from the group consisting of stainless steel and ceramic.

21. The method of claim 19, including utilizing a fuel tube and an oxygen tube which have a wall thickness between about 0.4 mm and 1.5 mm.

22. The method of claim 19, including increasing turbulence by placing at least one spiral wire between said fuel tube and said oxygen tube so as to produce angular momentum in said oxygen stream.

23. The method of claim 18, wherein said stream of fuel is projected from said fuel orifice at a velocity below about 500 ft./sec.

24. The method of claim 23, including projecting said stream of fuel from said fuel orifice at a velocity below about 250 ft./sec.

25. The method of claim 18, including projecting said streams of fuel and oxygen at a oxygen velocity to gas velocity ratio of about 1.5/1.

26. The method of claim 18, including utilizing a fuel orifice which has a cross-sectional area between about 0.00159 square inches and 0.00636 square inches.

27. The method of claim 26, including utilizing a fuel orifice which has a cross-sectional area of about 0.0038 square inches.

28. The method of claim 18, including placing said fuel orifice flush with said annular oxygen orifice.

29. The method of claim 18, including placing said fuel orifice in front of said annular oxygen orifice.

30. The method of claim 18, including placing said fuel orifice behind said annular oxygen orifice.

31. The method of claim 18, including utilizing an annular oxygen orifice which is divided into an arrangement of smaller circular orifices surrounding said fuel orifice.

* * * * *